United States Patent [19]
Abi-Ezzi et al.

[11] Patent Number: 5,261,029
[45] Date of Patent: Nov. 9, 1993

[54] METHOD AND APPARATUS FOR THE DYNAMIC TESSELLATION OF CURVED SURFACES

[75] Inventors: Salim S. Abi-Ezzi, Foster; Leon A. Shirman, San Jose, both of Calif.

[73] Assignee: Sun Microsystems, Inc., Mountain View, Calif.

[21] Appl. No.: 929,819

[22] Filed: Aug. 14, 1992

[51] Int. Cl.⁵ .............................................. G06F 15/72
[52] U.S. Cl. .................................... 395/123; 395/119
[58] Field of Search ............. 395/121, 123, 127, 142, 395/136, 133–139

[56] References Cited

U.S. PATENT DOCUMENTS

| | | | |
|---|---|---|---|
| 4,862,392 | 8/1989 | Steiner | 395/127 |
| 4,912,659 | 3/1990 | Liang | 395/126 |

OTHER PUBLICATIONS

Salim Abi-Ezzi: "The Graphical Processing of B-splines in a Highly Dynamic Environment," RPI Ph.D. dissertation, RDRC-TR-89001, Troy, N.Y. (May 1989).

Salim Abi-Ezzi and Michael Wozny: "Factoring a Homogeneous Transformation for a more Efficient Graphics Pipeline", Proc. Eurographics '90, Montreux, Switzerland, pp. 245–255, Sep. 1990.

Gerald Farin: Curves and Surfaces for Computer Aided Geometric Design: A Practical Guide, Academic Press, 1988.

R. Farouki and V. Rajan: "Algorithms for Polynomials in Bernstein form," Computer Aided Geometric Design, 5(1988), pp. 1–26, 1988.

Daniel Philip, Robert Magedson, and Robert Markot: "Surface Algorithms Using Bounds on Derivatives," Computer Aided Geometric Design, 3(1986), pp. 295–311, 1986.

Jeffrey Lane, Loren Carpenter, Turner Whitted, and James Blinn: "Scan Line Methods for Displaying Parametrically Defined Surfaces," Communications of the ACM, 23(1), Jan. 1980.

Jeffrey Lane and Richard Riesenfeld: "A Theoretical Development for the Computer Generation and Display of Piecewise Polynomial Surfaces," IEEE Transactions on Pattern Analysis and Machine Intelligence, 2(1), pp. 35–46, Jan. 1980.

Sheue-Ling Lien, Michael Shantz, and Vaughan Pratt: "Adaptive Forward Differencing for Rendering Curves and Surfaces," Computer Graphics, 21(4), pp. 111–117, Jul. 1987 Lien et al.

W. Press, B. Flannery, S. Teukolsky, and W. Vetterling: Numerical Recipes in C, Cambridge University Press, New York, 1988.

Alyn Rockwood: "A Generalized Scanning Technique for Display of Parametrically Defined Surfaces," IEEE Computer Graphics & Applications, pp. 15–26, Aug. 1987 Rockwood.

G. Wang: "The Subdivision Method for Finding the Intersection Between Two Bezier Curves or Surfaces", Zhejiang University Journal, Special issue on Computational Geometry (in Chinese), 1984.

Primary Examiner—Gary V. Harkcom
Assistant Examiner—Huynh Ba
Attorney, Agent, or Firm—Blakely Sokoloff Taylor & Zafman

[57] ABSTRACT

A method and apparatus for determining a uniform step size with respect to pre-transformation derivative bounds for tessellation of a graphic primitive wherein the step size results in triangles which meet post-transformation thresholds. To maximize the efficiency of rendering curved surfaces while ensuring that the tessellation criteria is met, a maximum scale value for the non-linear transformation between device coordinate (DC) and lighting coordinate (LC) space is determined and utilized to translate the tessellation threshold in DC space to a tessellation threshold value in LC space. Information regarding the curved surface to be rendered is transformed to the LC space from the model coordinate (MC) space. The derivative bounds of the curved surface, and the tessellation threshold value are utilized to determine the uniform step size to tessellate triangles representative of the curved surface. Accurate lighting computations are then performed and the shaded triangles are transformed to DC space, converted to pixel data and actuated on the display device to produce the graphic image representative of the graphic image on the display.

18 Claims, 4 Drawing Sheets

METHOD AND APPARATUS FOR THE DYNAMIC TESSELLATION OF CURVED SURFACES

BACKGROUND OF THE INVENTION

1. Field of the Invention

The present invention relates to the tessellation into triangles of graphic images on a computer graphics display device. More particularly, the present invention relates to the tessellation of curved surfaces into triangles for display of the curved surface on a computer graphics display device.

2. Art Background

In the past, computer graphic systems required expensive display and computer resources. The amount of computation time required to render images was substantial. Images of any complexity required powerful computers to process for hours in order to generate the image. Today, computer graphics technology has greatly improved. The rendering of three dimensional ("3D") objects is no longer a process reserved for expensive high-powered computers. The rendering of complex graphic objects is now realized on smaller, more affordable, less powerful computers.

However, there is still the need to increase the speed of rendering and manipulating complex graphic objects without incurring substantial computer overhead and cost. The problem of rendering curved surfaces is particularly problematic. In the past, techniques were developed to render curved surfaces directly from the curved surface primitives which define the surface. See, for example, Jeffrey Lane, Loren Carpenter, Turner Whitted, James Blinn, "Scan Line Methods For Displaying Parametrically Defined Surfaces", Communications of the ACM, 23(1), January, 1980; and Sheue-Ling Lien, Michael Shantz and Vaughan Pratt, "Adaptive Forward Differencing For Rendering Curves and Surfaces", Computer Graphics, 21(4), pp 111-117, July, 1987.

It has become advantageous to divide the larger primitives into triangles, for input to the a graphics accelerator which processes the triangle. Typical graphics accelerators are characterized by having special VLSIs for rendering triangles, complemented with microprogrammable floating point processors for floating point intensive tasks.

Triangles are a natural common denominator primitive to build special VLSIs for, as the triangle is a simple primitive and higher level primitives can be reduced to the triangle primitive. However the development of a graphics accelerator having VLSIs dedicated to rendering curved surfaces is not practical. Special VLSIs for curved surfaces would be limited to a specific class of surfaces, for example cubic Bezier only and would not be able to handle all classes of curved surfaces. Therefore, it becomes essential to have a technology for the efficient tessellation of high level curved surfaces into triangles.

SUMMARY OF THE INVENTION

The present invention provides a method and apparatus for determining a uniform step size based upon pre-transformation derivative bounds for tessellation of a curved surface wherein the step size results in triangles which meet post-transformation thresholds.

In the method and apparatus of the present invention, the derivative bounds are utilized to determine uniform tessellation step sizes for dynamic tessellation which meet specified tessellation criterion such as a threshold for the size of the resulting triangles or the deviation of a surface from the triangles generated. For viewing purposes, it is most useful to specify the tessellation criterion in display coordinate space. However, the tessellation should take place in world coordinate space or lighting coordinate space in order to perform accurate lighting calculations of the triangles which approximate the curved surface.

Furthermore, efficiency is increased and latency is decreased by taking advantage of the hardware configuration of the rendering system. The process is structured to perform complex operations initially at the general purpose computer which has the resources to perform the complex operations. Simple, but costly and highly repetitive, tasks are performed on dedicated graphics processors.

To maximize the efficiency of rendering curved surfaces while ensuring that the tessellation criteria is met, a maximum scale value for the non-linear transformation between device coordinate (DC) and lighting coordinate (LC) space is determined and utilized to map the tessellation threshold value from DC space to LC space. Information regarding the curved surface is transformed to the LC space from the model coordinate (MC) space. The derivative bounds of the curved surface, and the tessellation threshold value in LC space are utilized to determine the uniform step size to tessellate the curved surface into representative triangles. Accurate lighting computations are then performed and the light adjusted triangles are transformed to DC space, converted to shaded pixel data and actuated on the display device to produce the graphic object on the display.

Furthermore, through the method and apparatus of the present invention it is possible to apply the costly computation of derivative bounds only once in modeling coordinates. These bounds are then reusable under varying modeling and viewing transformations, consistently meeting size and/or deviation criteria in display coordinates.

BRIEF DESCRIPTION OF THE DRAWINGS

The objects, features and advantages of the present invention will be apparent to one skilled in the art in view of the following detailed description in which.

DETAILED DESCRIPTION

The method and apparatus of the present invention performs the complex operation of finding derivative bounds, computing norms of transformations, and factoring of view transformations at graphical data creation time, while performing fast and simple operations, such as mapping the derivative bounds to lighting coordinate space and mapping the approximation threshold into lighting coordinate space, where tessellation takes place, at traversal time. These operations are similarly distributed among the components of the system to take advantage of the processing power and resources of the components of the system to provide a system to render curve surfaces which is fast and cost effective.

Figure 1:
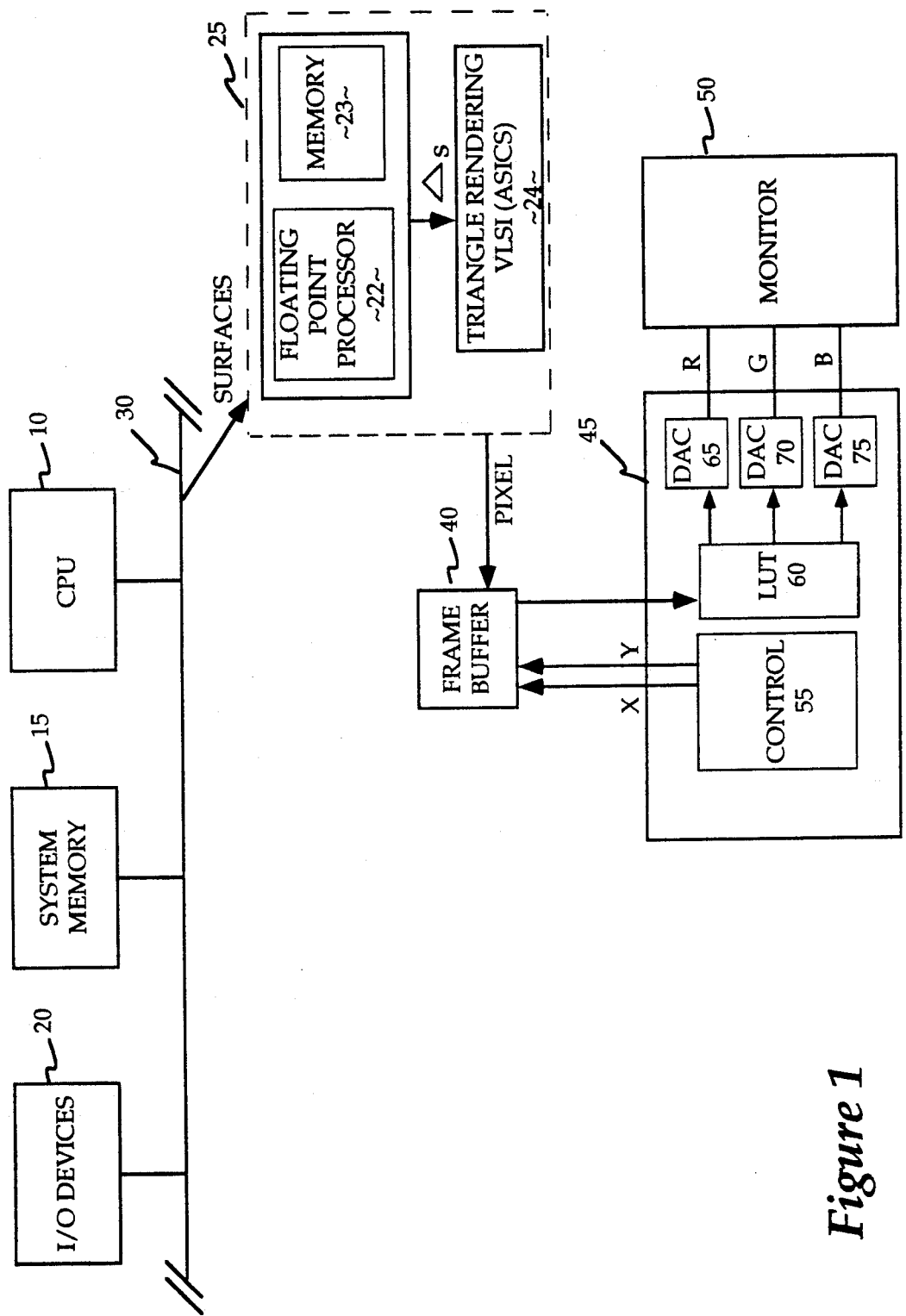
FIG. 1 is a conceptual block diagram illustrating a preferred embodiment of the system of the present invention.

The system of the present invention is conceptually illustrated by the block diagram of FIG. 1. A CPU 10, system memory 15, Input/Output (I/O) devices 20 and a graphics subsystem 25 are coupled via a system bus 30. The CPU 10 functions as the central or host processor and typically executes application programs that generate the curved surfaces which are displayed in accordance with the present invention. The CPU 10 functions as a powerful general purpose processor and utilizes the available resources such as the system memory 15, I/O devices 20 and other peripheral devices (not shown) to execute complex programs and processes. The CPU 10 may be configured into a system or workstation such as those manufactured by Sun Microsystems, Inc., Mountain View, Calif.

As will be more fully described subsequently, the graphics subsystem 25, comprising a floating point processor 22, memory 23 and VLSI 24, is configured to execute simple, but costly and highly repetitive computations required as part of the process for rendering curved surfaces. Preferably, at least a portion of the computations are performed by special, dedicated hardware, such as special VLSI 24 devices for the rendering of triangles, in order to further increase the speed of performing the processes. The graphics subsystem 25 utilizes the memory 23 for execution of the processes. The floating point processor 22 tessellates the curved surfaces to triangles and the VLSI 24 translates the triangles into pixel data for storage in the frame buffer 40. The pixel data is stored in the frame buffer 40 in a sequence readily identified with the x-y coordinate space of the display device 50.

The display controller 45 generates the display of the curved surface defined by the pixel data located in the frame buffer. The display controller 45 through its controller 55 cycles through the frame buffer, one scan line at a time in accordance with the raster scan rate, for example, 60 times a second. Memory addresses are generated by the controller 55 to access the pixel data. The pixel data is read from the frame buffer in sequence and input to the display controller color look-up table (LUT) 60. The LUT 60 contains the digital control signals used to control the intensity and color of the output, for example beams of electrons, on the display device 50. The signals output by the LUT 60 are input to digital to analog converters (DACs) 65, 70 and 75 which generate the analog signals to control the energizing or generation of the location and intensity respectively of the red, green and blue components of the pixel to be displayed. The display device may be a raster scan device such as a cathode ray tube (CRT). For purposes of explanation the display device will be a CRT; however it is obvious to one skilled in the art that other display devices may be utilized in accordance with the system of the present invention.

If the device is a cathode ray tube, the analog control signals control the number of electrons in the beam. The number of electrons in the beam is determinative of the intensity displayed. By controlling the red, green and blue beams for each pixel in this manner, varying colors and intensities can be produced on the display device. The beam(s) of electrons are directed towards a phosphor coated screen by a high positive voltage applied. The beams are directed toward a particular location (reflective of the x-y coordinate location of the pixel data) by a magnetic field produced by deflection coils. When the electrons of the beam hit the screen, the phosphor emits visible light, the intensity emitted dependent upon the number of electrons which hit the screen.

Figure 2:
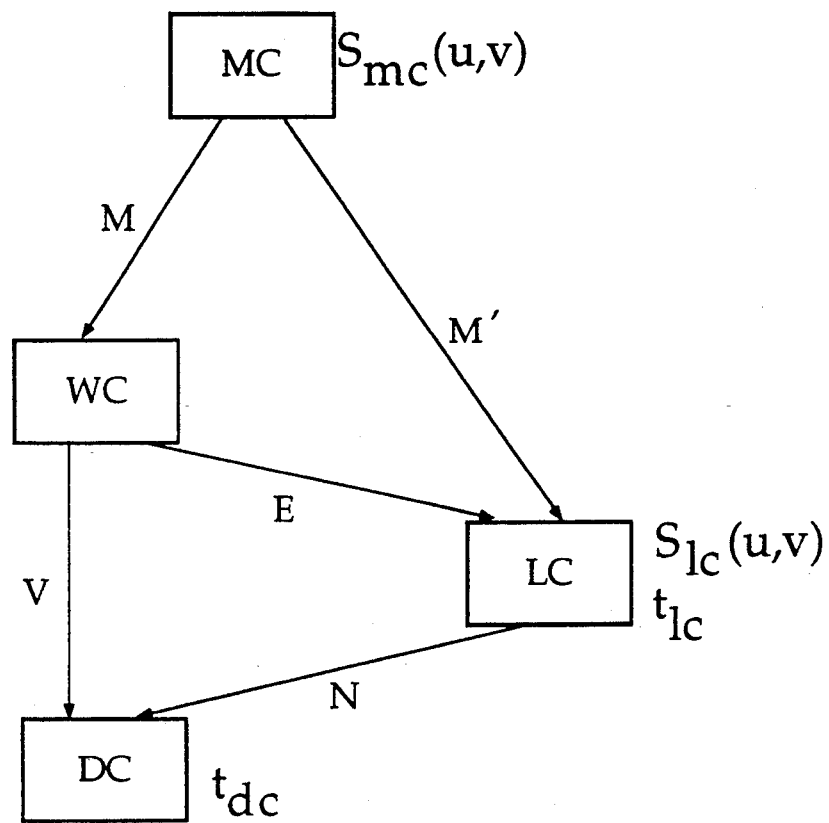
FIG. 2 illustrates the different coordinate spaces utilized during the rendering process.

The process for performing uniform tessellation of curved surfaces which meets post-transformation thresholds will now be discussed. Referring to FIG. 2, graphical objects are defined in an object coordinate or modeling coordinate (MC) system. Objects are transformed into the world coordinate (WC) system by a modeling transformation "M". The world coordinate system is the coordinate system in which the different portions of a graphic object to be rendered are assembled. Through the transformation "V", the graphic object in the WC system is transformed to the Device Coordinate (DC) system which corresponds to the screen space of the computer display. An additional coordinate system, the Lighting Coordinate (LC) system, is extracted. The LC system is reached from the WC system through a rigid transformation "E" and the DC system is reached from the LC system through a sparse "N" transformation. For further information regarding the LC space and transformations for the same, see Salim Abi-Ezzi and Michael J. Wozny, "Factoring a Homogeneous Transformation for a More Efficient Graphics Pipeline", Computer and Graphics, Vol 15, No. 2, pp. 249-258, 1991.

As noted earlier, the tessellation criterion is expressed as a threshold value, such as a threshold value for the size of the resulting triangles or the deviation of the triangles from the surface the threshold value is specified in the DC space since the tessellation criteria is intended to control the visual representation of the object which occurs in DC space. If the tessellation is performed in DC space, adaptive techniques may be easily applied to compare the resultant triangles to the deviation threshold and adjust the tessellation step size parameter as necessary. Although tessellation may be performed in the DC space, the resultant triangles are inappropriate for performing subsequent lighting calculations. The "V" transformation which transforms the graphic object from the WC space to the DC space is typically a non-rigid transformation; therefore the triangles in DC space do not maintain all the dimensional characteristics specified in WC space. Lighting calculations performed on the distorted triangles result in distorted lighting. However, the tessellation of a curved surface into triangles in WC space is a problem since tessellation criteria that the triangles must meet is specified in DC space. Furthermore, the V transformation employs a 4×4 homogeneous matrix which is computationally expensive. If the triangles are tessellated in WC space and transformed to DC space, the resultant cost is quite significant. It is preferable to avoid the cost in computational overhead and speed caused by transforming the large volume of sample points generated during the tessellation of these surfaces and transform only the minimal control information of the curved surfaces prior to tessellation.

As the transformation from DC space to LC space is non-linear, the scaling of a distance measure, such as the tessellation threshold, is quite difficult to formalize and to effect since the scale depends upon the position and orientation of the distance being scaled.

To maximize the efficiency of rendering curved surfaces by avoiding the computation of derivative bounds at traversal time while ensuring that the tessellation criteria is met, a maximum scale is determined to map the tessellation threshold value from the DC space to LC space. It has been found that by determining the maximum scale of the DC to LC transformation and determining the tessellation threshold value from the tessellation threshold specified in DC space and the maximum scale with respect to the DC to LC transform, the triangles tessellated in LC space to be within the tessellation threshold value in LC space meet the tessellation threshold in DC space when the triangles are subsequently transformed to the DC space.

The transformation between LC space and DC space, "N", is "sparse", i.e., the calculations required to perform the transformation are minimal, and enable a closed form expression to be determined for the maximum scale of N. Thus, the overhead required to determine the maximum scale and map a tessellation threshold value to the LC space is also minimal.

In addition to the tessellation threshold value being mapped to LC space, the information regarding the curve surface to be rendered is transformed to the LC space from the MC space. However, only the control points of the curve to be rendered and the derivative bounds of the curve are mapped to LC space and the control points are transformed from the MC space to the LC space using the relatively computationally expensive M' transformation (M' = ME). Once the derivative bounds, control points and the tessellation threshold value are located in the LC space, a uniform step size is determined in the LC space which meets the tessellation criteria in DC space and the triangles representing the curved surface are extracted using the uniform step size. The representative triangles generated for the curved surface are then quickly transformed to DC space using the sparse transformation N for subsequent scan conversion and actuation on the display device.

The process of the present invention enables a distributed high speed graphic rendering system to be utilized. The complex calculations initially performed utilize the host computer which typically has the resources to perform the calculations. Fast, dedicated co-processors and hardware are then utilized to perform the repetitive and costly computations (such as the tessellation of the curved surface into triangles) to provide a cost efficient curved surface rendering system.

Figure 3:
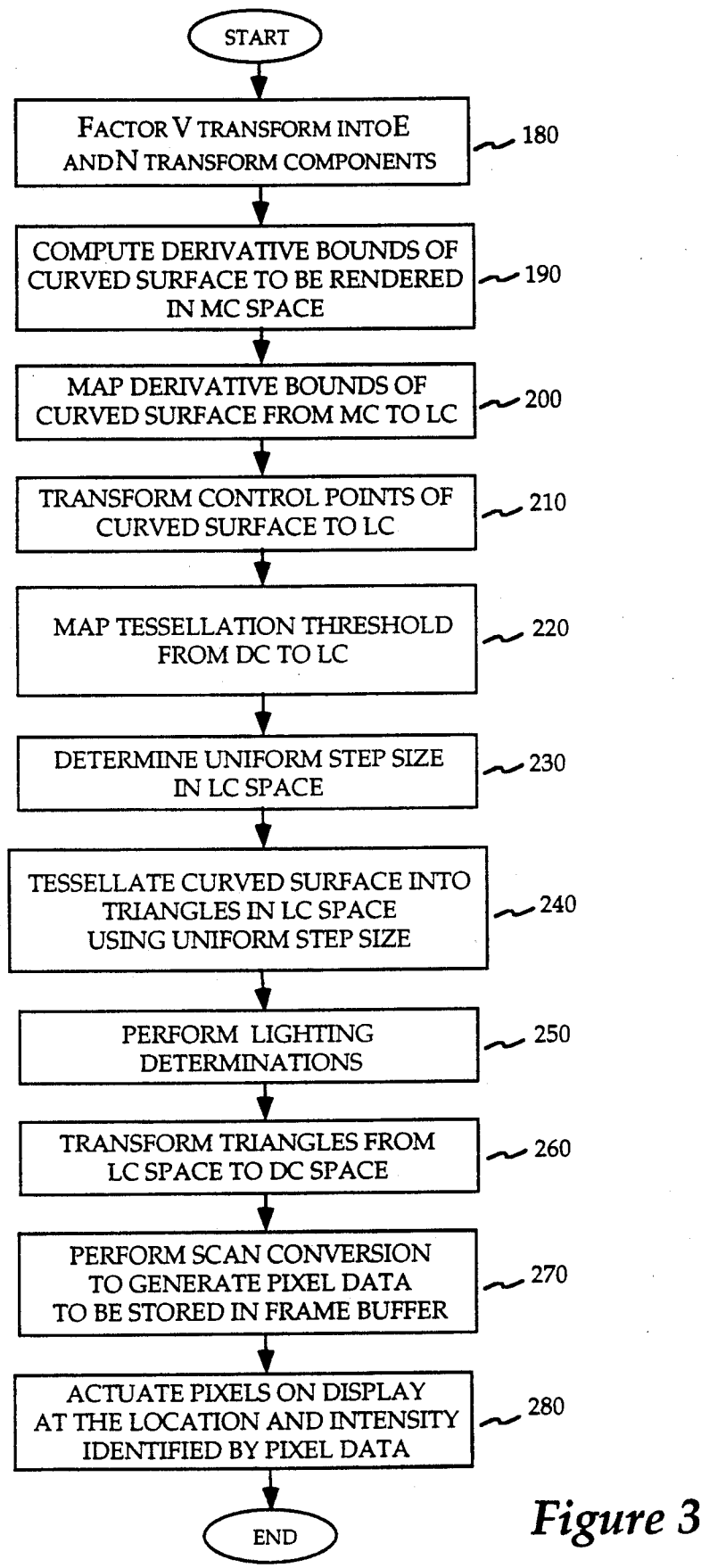
FIG. 3 is a flow diagram illustrative of the preferred embodiment of the process of the present invention.

The process will be explained with reference to FIG. 3. At step 180, the V transform for translating a graphic object from WC space to DC space is broken down into two transforms, E and N. The E transform maps the graphic object from the WC space to the LC space. Although costly to utilize, the E transform is rigid and hence it preserves angles and distances. The N transform is a simple, sparse transformation which maps the graphic object from LC space to DC space. Although the N transform is computationally inexpensive, it is a projective transformation and hence it does not preserve angles and distances. As will be more fully discussed below, certain steps of the process of the present invention are performed in different coordinate spaces to minimize the rendering time and cost while maintaining accuracy in rendering of the graphic object.

At step 190, the derivative bounds of the curved surface to be rendered are determined in MC space. Preferably the curved surface is expressed in the Bezier form. A Bezier curved surface has a convex hull property which provides that the curved surface is contained within the convex hull of the control points for the surface. By expressing the curved surface in the Bezier form, the determination of the derivative bounds is somewhat simplified by exploiting the convex hull properly to obtain the derivative bounds. The derivative bounds are determined by examining the control point of the derivative surface function which is furthest from the origin in the coordinate space. Preferably the derivative bounds are determined according to the following equations:

First order:

$$D_u = \sup_{u,v \in [0,1]} \left\| \frac{\partial S(u,v)}{\partial u} \right\|$$

$$D_v = \sup_{u,v \in [0,1]} \left\| \frac{\partial S(u,v)}{\partial v} \right\|$$

and

Second order:

$$D_{uu} = \sup_{u,v \in [0,1]} \left\| \frac{\partial^2 S(u,v)}{\partial u^2} \right\|$$

$$D_{uv} = \sup_{u,v \in [0,1]} \left\| \frac{\partial^2 S(u,v)}{\partial u \partial v} \right\|$$

$$D_{vv} = \sup_{u,v \in [0,1]} \left\| \frac{\partial^2 S(u,v)}{\partial v^2} \right\|$$

where the first order derivative bounds $D_u$, $D_v$ are used to enforce a size criterion and the second order derivative bounds, $D_{uu}$, $D_{uv}$, $D_{vv}$ are used to enforce a deviation criterion.

The above equations for the determination of derivative bounds require significant computational overhead. As noted earlier, it is preferable that curved surface primitives are represented in Bezier form to simplify the determination of derivative bounds. Thus, for a polynomial Bezier curve P(t) of degree d and control points $B_i$, the first derivative bound can be computed using the convex hull property:

$$\| P'(t) \|_{max} \leq \max_{i=0}^{d-1} \| d(B_{i+1} - B_i) \|$$

Similarly, the second order derivative bound is:

$$\| P'(t) \|_{max} \leq \max_{i=0}^{d-2} ( \| d(d-1)(B_{i+2} - 2B_{i+1} + B_i) \| )$$

Similar formulas work for derivative bounds of surfaces. For rational curves and surfaces, derivative bounds are found using the convex hull property of resulting Bezier expressions.

As can be realized by examining the above equations, these computations involved are quite complex and therefore time consuming and costly. Therefore it is advantageous to perform these computations as infrequently as possible. To minimize the expense of performing these computations, the derivative bounds are determined once for a curved surface in the MC space. Subsequent renderings of the surface do not cause the derivative bounds in MC to change; therefore a single determination of the derivative bounds is used for subsequent renderings of the curved surface.

Once the derivative bounds are determined, at step 200, the derivative bounds of the curved surface are transformed from MC space to LC space. The transformation of points from MC space to LC space is accomplished by applying a transform M' which is the combination of the transform M to transform a graphic object from the MC space to the WC space and the transform E which transforms a graphic object from the WC space to the LC space. The M' transformation is affine. The manner in which an affine transform modifies space is independent of position and dependent only on orientation. As the derivative bound is a vector quantity, only the linear components of the M' transformation is utilized to map the derivative bounds into LC space. Therefore, the norm of the transformation which is the maximum scale a transform is capable of is utilized to perform the mapping. The norm of the transform L can be defined as:

$$\|L\| = \max_{\bar{v} \in R^3 - [0,0,0]} \frac{\|L\bar{v}\|}{\|\bar{v}\|} = \sqrt{\lambda_{max}(L^T L)}$$

where $\lambda_{max}$ is the maximum eigenvalue of $L^T L$ and $R^3$ represents three dimensional space. In general, to find $\|L\|$, the maximum eigenvalue of a 3×3 matrix is determined. This involves finding the roots of the cubic characteristic polynomial $det(L^T L - \lambda I) = 0$. Closed form expressions for these roots are described in W. Press, B. Flannery, S. Teukolsky and W. Vetherling, *Numerical Recipes in C*, p. 157, (Cambridge University Press 1988). Preferably the norm of the modeling transformation M is determined once at graphical data creation time. Subsequently, a bound on the norm of the composite transform M'=AB can be obtained using the inequality $\|AB\| \leq \|A\| \|B\|$, where $\|AB\|$ represents the norm M', $\|A\|$ and $\|B\|$ represent the norms of A and B, respectively. Thus, at the creation time the costly computations of the derivative bounds are determined and the cheaper computations are performed at traversal time. The derivative bounds in MC are simply multiplied by the norm of M' to map the derivative bounds into LC space.

The control points defining the curved surface are also required for tessellation. Therefore, at step 210, the control points of the curved surface are transformed from the MC space to the LC space. As the control points are specified points in MC space, the M' transform is used to transform the control points to LC space.

At step 220 the tessellation threshold is established in DC space and the tessellation threshold is mapped to LC space in accordance with the sparse transform N. The tessellation threshold should dictate appropriately sized triangles for display purposes. Therefore, the triangles should not be too small which would result in the oversampling of the surface, nor too big which would result in an inferior rendering of the curved surface. Preferably the tessellation threshold is derived from one of two types of tessellation criteria. The size criterion places a threshold on the size of the resulting tessellated triangles. The deviation criterion places a threshold on the deviation of the triangles from the actual surface. Although these two criteria are separately useful, they may also be useful when used in a combined form.

While the deviation criterion defines proximity of the tessellation to the surface, the size criterion defines a certain level of sampling for the lighting equation, which is important if the triangles are to be Gouraud shaded.

To generate the tessellation threshold in LC space, the maximum scale of the viewing transformation "V" is determined in the convex hull of the primitive being tessellated. As the viewing transform is not linear, the resultant mapping is dependent upon the location where the transform takes place. As the curved surface lies within the convex hull defined by the control points, the determination of the maximum scale of the transform is simplified by determining the maximum scale with respect to the space defined by the convex hull.

If the viewing transformation is a parallel transformation, V can be factored into V=LE as follows:

$$V = \begin{bmatrix} s_x & 0 & s_x h_x & 0 \\ 0 & s_y & s_y h_y & 0 \\ 0 & 0 & s_z & 0 \\ 0 & 0 & 0 & 1 \end{bmatrix} \begin{bmatrix} a_{00} & a_{01} & a_{02} & t_y \\ a_{10} & a_{11} & a_{12} & t_y \\ a_{20} & a_{21} & a_{22} & t_z \\ 0 & 0 & 0 & 1 \end{bmatrix}$$

Where L maps LC space to DC space and $s_x$ is the scale with respect to x, $s_y$ is the scale with respect to y and $s_z$ is the scale with respect to z, $h_x$ and $h_y$ are shear factors with respect to x and y, $t_x$, $t_y$, $t_z$ respectively are translation factors and $a_{00}$-$a_{22}$ are the elements of the matrix E. As L is a linear transformation, the norm of L can be used to map the threshold such that $t_{lc} = t_{dc}/\|L\|$. Furthermore, if $h_x = h_y = 0$, then $\|L\| = \max(s_x, s_y, s_z)$.

Typically a perspective transformation is utilized. For a perspective viewing transformation, V can be factored into V=TQE as follows:

$$V = \begin{bmatrix} 1 & 0 & 0 & t'_x \\ 0 & 1 & 0 & t'_y \\ 0 & 0 & 1 & 0 \\ 0 & 0 & 0 & 1 \end{bmatrix} \begin{bmatrix} s_x & 0 & 0 & 0 \\ 0 & s_y & 0 & 0 \\ 0 & 0 & s_z & 0 \\ 0 & 0 & -1/P_z & 1 \end{bmatrix} \begin{bmatrix} a_{00} & a_{01} & a_{02} & t_x \\ a_{10} & a_{11} & a_{12} & t_y \\ a_{20} & a_{21} & a_{22} & t_z \\ 0 & 0 & 0 & 1 \end{bmatrix}$$

where Q is a perspective (non-linear) transform which maps LC to an intermediate coordinate (IC) space, which is a translation away from DC space, $P_z$ is the distance between the origin and the eye point P, which lies on the positive Z axis in LC, and $t'_x$ and $t'_y$ are the auxiliary translation factors. Unlike affine transformations, the scaling behavior of perspective transformations is fairly complex as it depends upon the position, orientation and size of the object to be transformed.

The maximum scale of the transformation can therefore be determined as follows: the far plane in LC coincides with the x,y plane and the near plane is in between the eye point P and the far plane. A first point A of a segment AB is chosen to be behind the near plane and point B is arbitrary. The square of the scale of Q of segment AB can be defined as:

$$s_Q^2(A,B) = \frac{|(QA)(QB)|^2}{|AB|^2}$$

Evaluating the above equation with respect to a point P and taking the limit of the equation as the length of the segment [AB] goes to zero results in:

$$\xi_Q(A,B) = \lim_{|AB| \to 0} s_Q(A,B)$$

where $\xi_Q$ represents the limit of $s_Q$ as the length of line segment AB approaches 0, and $s_Q$ represents the scale of Q of segment [AB]. Transformation Q is applied to points A and B and the results are substituted into the expression for $\xi_Q$. The derivative of the resulting expression is then taken and equated to 0 in order to find the maximum of $\xi_Q$ with respect to orientation of segment AB. To simplify computations, a closed from expression for the maximum was determined for all possible directions in three dimensions, i.e., $\forall B \in R^3 - A$ $$\xi^2_{max,Q}(A) = \frac{P_z^2}{2d^2}(X_4 + X_1 + \sqrt{(X_4 - X_1)^2 + 4X_1X_2})$$

where $$X_1 = d^2 s^2, X_2 = h^2 s^2, X_3 = P_z^2 s_z^2, X_4 = X_2 + X_3$$

and d is the distance between the Z coordinate of A and the eye point P (which lies on the Z axis), h is the distance from A to the Z axis, and $s = \max(s_x, s_y)$. It should be noted that the quantity under the square root is always positive and the scale factor increases as d decreases and h increases.

Thus, for a Bezier patch S(u,v), having control points $B_{ij}$ in LC space and a perspective transformation Q having a viewing volume determined by a near plane and far plane and a window on a viewing plane, the near plane is at a distance $d_n$ from the eye point P, and the window is determined by its four corner points $W_k$.

A bound to the maximum scale that the transformation Q is capable of is determined for the non-clipped portion of the patch S(u,v) as there is no need to meet the threshold with respect to the clipped away portion. For point A where $A_z$ is not equal to $P_z$, the following function is defined:

$$\tau(A) = \tan^2(\angle(A,P,O)) = \frac{A_x^2 + A_y^2}{(P_z - A_z)^2}$$

The bound may then be determined by substituting the below values for d and h in the below equation for the closed form expression:

$$s_Q^2 = \frac{P_z^2}{2d^4}(X_4 + X_1 + \sqrt{(X_4 - X_1)^2 + 4X_1X_2})$$

where:

$X_1, X_2, X_3,$ and $X_4$ are as above and $$t = \min\left(\max_{ij}\left(\tau(B_{ij}), \max_k(\tau(W_k))\right)\right),$$

$$d = \max\left(\min_{ij}(P_z - B_{ij,z}), d_n\right),$$

and $$h^2 = d^2 t$$

Therefore, even if a surface is wrapped around infinity by the perspective transformation, this approach guarantees a bounded maximum scale.

Once the bound, the maximum scale of the viewing transformation Q ($s_Q$) is determined for a specific surface primitive, according to the above equation the tessellation threshold (in DC space) can be mapped to a tessellation threshold value in LC space:

$$t_{lc} = t_{dc}/s_Q$$

The uniform step size can be determined, step 230, once the derivative bounds are mapped and control points of the curved surface are transformed to the LC space and the threshold is mapped to LC space. It has been found that by determining the derivative bounds for the curved surface in MC space, mapping the bounds to the LC using the norm of the modeling transformation, and by mapping the tessellation criteria from DC space to LC space to generate the tessellation threshold using the maximum scale of the perspective viewing transformation, a uniform step size is determined which results in the tessellation into triangles which meet the tessellation criteria in DC space.

Uniform step sizes for surfaces $S_s^u$ $S_s^v$ which meet a size threshold are determined according to the following:

$$s_s^u = \frac{1}{n_s^u} \text{ where } n_s^u = \left\lceil \frac{D_u}{t_s^u} \right\rceil$$

$$s_s^v = \frac{1}{n_s^v} \text{ where } n_s^v = \left\lceil \frac{D_v}{t_s^v} \right\rceil$$

where $n_s^u$ and $n_s^v$ are the numbers of steps in u and v directions, $D_u = |S_u(u,v)|_{max}$ and $D_v = |S_v(u,v)|_{max}$, which respectively represent the first order derivative bounds of the curved surface to be rendered in the u direction and v direction, and $t_s^u$ and $t_s^v$ represent the size threshold respectively in the u direction and v direction.

The deviation threshold is related to the second order derivative of parametric curves and surfaces. Filip established that the deviation threshold relates to the second order derivative bounds and number of steps in U and V according to the following:

$$t_d = \frac{1}{8}\left(\frac{1}{(n_d^u)^2} D_{uu} + \frac{2}{n_d^u n_d^v} D_{uv} + \frac{1}{(n_d^v)^2} D_{vv}\right)$$

where $t_d$ represents the deviation threshold, and $n_d^u$ and $n_d^v$ represent the number of steps respectively in the u and v directions for tessellation (For further information see Daniel Filip, Robert Magedson and Robert Markot, "Surface Algorithms Using Bounds on Derivatives", *Computer Aided Geometric Design*, No. 3, pp. 295-311 (1986)).

The derivative bounds for the surface function, $D_{uu}$, $D_{uv}$ and $D_{vv}$, are determined according to the following:

$$D_{uu} = \sup_{u,v \in [0,1]} \left\| \frac{\partial^2 S(u,v)}{\partial u^2} \right\|,$$

$$D_{uv} = \sup_{u,v \in [0,1]} \left\| \frac{\partial^2 S(u,v)}{\partial u \partial v} \right\|,$$

$$D_{vv} = \sup_{u,v \in [0,1]} \left\| \frac{\partial^2 S(u,v)}{\partial v^2} \right\|,$$

It can be seen from the above equations the large amount of computational overhead required to determine the derivative bounds. In addition, it should be noted that in the equation above, $(t_d)$ includes two unknown values $n_d^u$ and $n_d^v$. In order to solve the equations certain assumptions are made which do not guarantee that the minimum number of triangles are generated. This is critical as the fewer triangles generated, the less costly the rendering of the surface.

In the present invention, in order to guarantee the minimum number of triangles are generated, the product $n_d^u * n_d^v$ is minimized. The equation is first modified by substituting $kn_d^v$ for $n_d^u$ and solving for $n_d^v n_d^u$:

$$n_d^u n_d^v = \frac{D_{uu} + 2kD_{uv} + k^2 D_{vv}}{8kt_d}$$

The values of $D_{uu}$, $D_{uv}$, $D_{vv}$ and $t_d$ are not dependent of the value of k. By taking the derivative of the right side of the equation with respect to k and equating the equation to zero, the minimum is determined. Thus, the minimum of the function is determined when the following is satisfied:

$$k = \sqrt{\frac{D_{uu}}{D_{vv}}}$$

Substitution of the above equation into the equation for $t_d$ provides for the determination of the number of uniformly spaced steps in the u direction and v direction. Specifically $n_d^u$ is substituted for $n_d^v$ and $$\sqrt{\frac{D_{uu}}{D_{vv}}}$$

is substituted for k. Solving for $n_d^u$ results in the number of uniformly spaced steps in the u direction:

$$n_d^u = \frac{\sqrt{D_{uu}D_{vv} + D_{uv}\sqrt{D_{uu}D_{vv}}}}{2\sqrt{t_d D_{vv}}}$$

Similarly substituting $kn_d^v$ for $n_d^u$ and $$\sqrt{\frac{D_{uu}}{D_{vv}}}$$

for k, and solving for $n_d^v$ provides the number of uniformly spaced steps in the v direction:

$$n_d^v = \frac{\sqrt{D_{uu}D_{vv} + D_{uv}\sqrt{D_{uu}D_{vv}}}}{2\sqrt{t_d D_{uu}}}$$

From these values, the step size is determined to be:

$$s_d^u = \frac{1}{n_d^u} \qquad s_d^v = \frac{1}{n_d^v}$$

The bounds to the above partial derivatives are determined by expressing them as polynomial or rational Bezier surfaces and exploiting the convex hull property. Although the computation of the derivative bounds is expensive, the overall effect is minimized by the process as the computation of the bounds is performed once and these bounds are reapplied for subsequent transformations of the graphic object. Therefore, once the derivative bounds are initially determined, they are used for each subsequent transform of the graphic object.

Once the uniform step size in u and v is determined, the curved surface is tessellated into a plurality of triangles, step 240. Preferably a technique such as forward differencing is used to incrementally determine the endpoints of the triangle. For further discussion regarding the tessellation of curved surfaces, see Gerald Farin, *Curves and Surfaces for Computer Aided Geometric Design: A Practical Guide*, (Academic Press, 1988).

Lighting calculations are then performed on the tessellated triangles, step 250. As a rigid transformation from WC to LC space was performed, thus the angles and distances are preserved in LC space. Thus accurate lighting of the curved surface can be performed. For additional information, see, Abi-Ezzi, Wozny, "Factoring a Homogeneous Transformation For a More Efficient Graphics Pipeline", *Computers and Graphics*, Vol 15, No. 2, pp. 249-258, 1991.

Any form of lighting may be utilized. Preferably Gouraud shading is used which utilizes intensity interpolation. For further information on Gouraud shading, see Foley, van Dam, Feiner, Hughes, *Computer Graphics, Principles and Practice*, 2d edition, pp. 736-737 (1990 Addison-Wesley Publishing).

Once the triangles include lighting characteristics, the triangles are transformed from LC space to DC space, step 260. As noted above, the N transformation which transforms objects from LC space to DC is a sparse transformation and is quite inexpensive to apply. Although a greater number of transformations is required to transform all tessellated triangles representative of a curved surface, the sparseness of the transform as well as the resultant effect of generating accurately shaded curved surfaces more than justifies the costs.

The triangles are scan converted to generate the pixel data used to control the display apparatus, step 270. The pixel data generated in DC space will define various attributes of the object to be displayed, including the shape location, color and intensity of the object on the display of the object. The pixel data generated is stored in a frame buffer at a location which corresponds with a predetermined position on the display device. For further information regarding scan conversion, see Foley, van Dam, Feiner, Hughes, *Computer Graphics, Principles and Practice*, 2d edition, pp. 945-965 (1990 Addison-Wesley Publishing). Preferably Z buffering is performed at this time to provide for hidden surface removal of graphic objects.

The curved surface is generated, step 280, on the display device according to the pixel data generated. The pixel data stored in the frame buffer is decoded to control the display controller and display device to actuate pixels at the location, color and intensity specified by the pixel data to generate a visible curved surface on the display device.

The above process further provides for a system in which the complex operations of finding derivative bounds, computing norms of transformations, and factoring of views at data creation time, can be performed in the host processor which has the resources for performing these complex processes. The simple but repetitive operations such as the tessellation in LC space into triangles at traversal time and the generation of pixels can then be performed in dedicated processing devices. Furthermore, the above process provides for a system which is adaptable to varying types of curved surfaces wherein the same high speed dedicated hardware provided to perform certain procedures of the rendering process can be used.

Figure 4:
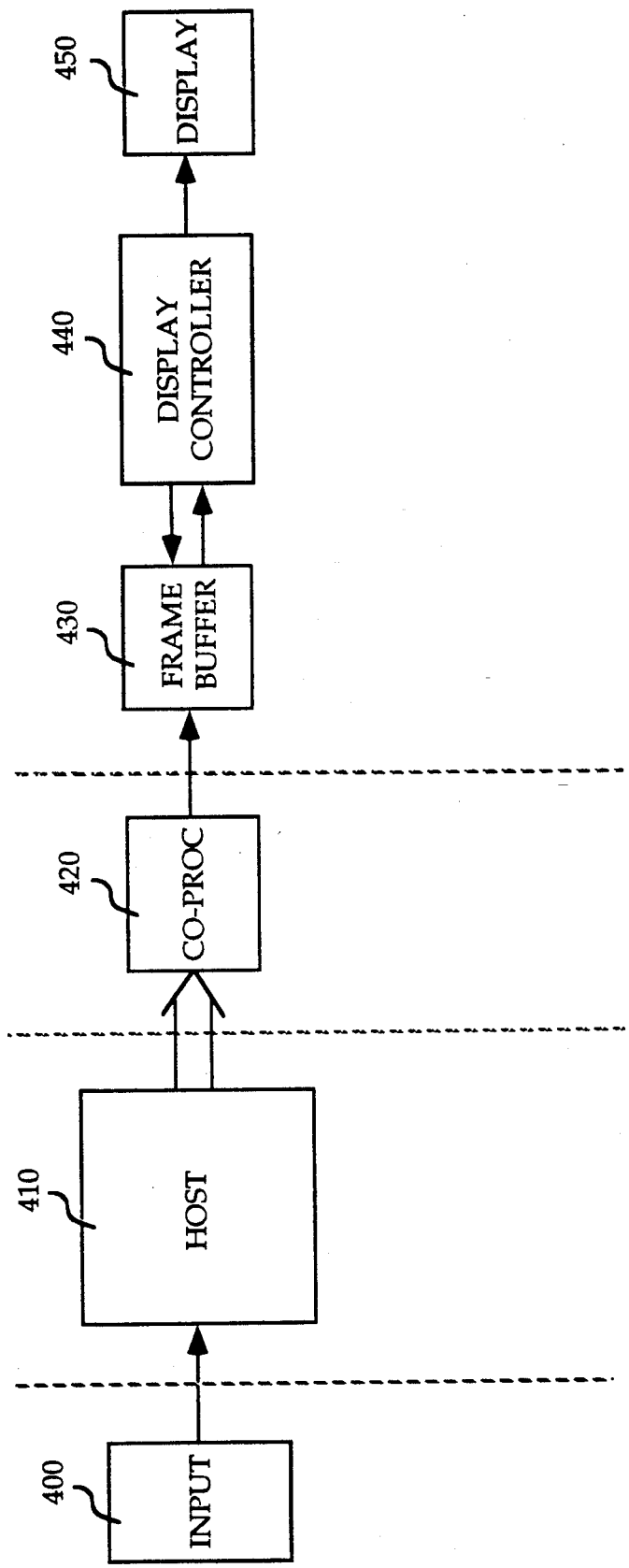
FIG. 4 conceptually illustrates the hardware distribution of processes to perform the rendering process of the present invention.

The system of the present invention may be best described with reference to FIG. 4. Input 400 is provided to the host computer 410. The host is utilized to perform the complex processes and computations which require significant resources. The co-processor 420 is a dedicated processor which performs straightforward but highly repetitive process steps. The process of the present invention lends itself to subdivision of process steps to maximize efficiency of the rendering pipeline. In particular, the host factors the transform between world coordinate space and device coordinate space into the E and N transforms. Furthermore, the host processor 410 performs the determination of the derivative bounds of the curve surface to be rendered and transforms the derivative bounds from MC space to LC space, and the approximation threshold from DC to LC. The determination of the uniform step size is also determined at the host 410.

In one embodiment, the uniform step size and the control points of the curved surface are sent to the co-processor 420 to perform the highly repetitive computations such as tessellation of the triangles representing the curve surface, lighting determinations and scan conversion of the triangles to pixel data to be stored in the frame buffer 430. In this embodiment, the coprocessor consists of a floating point processing unit (FPU), memory and a VLSI design to render triangles to generate pixel data. The FPU, utilizing the memory, tessellates the curved surface into triangles, performs lighting determinations and translates the triangles from LC space to DC space. The VLSI converts each triangle into pixel data and stores the pixel data in the frame buffer. Alternately, the host 410 tessellates the curved surface into triangles and the co-processor simply performs the scan conversions to generate pixel data for each triangle. Preferably, the co-processor 420 is implemented in dedicated hardware to maximize the speed of processing. An example of a graphics co-processor 420 is SPARCstation 2/GT graphics accelerator manufactured by Sun Microsystems, Inc.

The display controller, a second dedicated processor, 440 reads the pixel data from the frame buffer and actuates the corresponding pixels on the display device 450. As noted earlier, the pixel data is stored at predetermined locations in the frame buffer such that there is a predetermined relationship between the location of pixel data in the frame buffer and the actuation of pixels according to that pixel data on the display device. Preferably, the data is stored according to the XY coordinate location of the pixel in the DC space. The display controller 440 sequentially reads the pixel data from the frame buffer 430 and issues control signals to the display device to control the electron beams and therefore, the color, intensity and location of each pixel.

While the invention has been described in conjunction with the preferred embodiment, it is evident that numerous alternatives, modifications, variations and uses will be apparent to those skilled in the art in light of the foregoing description. For example, the invention has been described with respect to the rendering of curved surfaces; however, the concepts described herein may be applied to other graphic entities such as curved lines.

In the claims:

1. In a computer system comprising a central processing unit (CPU), memory and input/output devices including a graphic display controller coupled to a graphic display device, a method for dynamic tessellation of graphic primitives comprising curved surfaces for rendering the graphic primitives as graphic images on the graphic display device, said primitives defined in a Model Coordinate (MC) space according to control points, transformed to World Coordinate (WC) space and rendered as images in Device Coordinate (DC) space, said graphic display device defined according to said DC space, said tessellation meeting a tessellation threshold defined in the DC space, said method comprising the steps of:

determining derivative bounds of the curved surface to be tessellated and rendered;

mapping the derivative bounds to a Lighting Coordinate (LC) Space;

transforming the control points of the graphic image to the LC space;

mapping a tessellation threshold to the LC space;

determining a uniform step size in the LC space which is within the tessellation threshold mapped to the LC space;

tessellating the curved surface into polygons;

lighting the polygons in accordance with light sources defined for the graphic image to be rendered;

transforming the polygons from the LC space to the DC space;

generating pixel data representative of each polygon, each pixel data specifying an intensity of the pixel to be displayed on the graphic display device;

storing each pixel data in a frame buffer, each pixel data being stored at a location in the frame buffer corresponding to a location of the pixel in the DC space;

said graphic display controller reading the pixel data stored in the frame buffer and generating control signals to actuate the pixels at the location and intensity indicated by the pixel data;

wherein curved surfaces are dynamically tessellated into graphic images in the LC space and transformed to the DC space.

2. The method as set forth in claim 1, wherein said step of mapping the derivative bounds of the curved surface to the LC space comprises the step of mapping the derivative bounds according to a norm of an M' transformation utilized to transform the curved surface from MC space to LC space.

3. The method as set forth in claim 1, wherein the step of transforming the control points of the curved surface to the LC space comprises transforming the control points using an M' transform utilized to transform the curved surface from the MC space to the LC space, said M' transform being an affine transform.

4. The method as set forth in claim 1, wherein the step of mapping the tessellation threshold to LC space comprises mapping the tessellation threshold using a maximum scale of an N transformation, said N transformation being a transformation which transforms the graphic image from the LC space to the DC space.

5. The method as set forth in claim 1, wherein the step of determining the uniform step size in the LC space comprises the step of determining the uniform step size according to the following:

$$s_d{}^u = \frac{1}{n_d{}^u} \quad s_d{}^v = \frac{1}{n_d{}^v}$$

where $s_d{}^u$ and $s_d{}^v$ respectively represent the uniform step size in the u direction and the v direction and $$n_d{}^u = \frac{\sqrt{D_{uu}D_{vv} + D_{uv}\sqrt{D_{uu}D_{vv}}}}{2\sqrt{t_d D_{vv}}}$$

$$n_d{}^v = \frac{\sqrt{D_{uu}D_{vv} + D_{uv}\sqrt{D_{uu}D_{vv}}}}{2\sqrt{t_d D_{uu}}}$$

where $D_{uu}$ is the second derivative bound of the surface function representative of the curved surface with respect to u, $D_{vv}$ is the second derivative bound of the surface function with respect to v and $D_{uv}$ is the derivative bound of the surface function with respect to u and v, and $t_d$ is the tessellation threshold in the LC space.

6. The method as set forth in claim 1, wherein the polygons are triangles.

7. The method as set forth in claim 1, wherein the step of tessellating the curved surface comprises the step of tessellateing the curved surface using forward differencing.

8. The method as set forth in claim 1, wherein the step of generating pixel data utilizes Gouraud shading to obtain an accurate color for each pixel.

9. The method as set forth in claim 1, wherein the step of transforming the polygons to the DC space from the LC space comprises the step of transforming the polygons using an N transformation.

10. The method as set forth in claim 1, further comprising the step of defining the curved surface as a Bezier function.

11. In a computer system comprising a central processing unit (CPU), memory and input/output devices including a graphic display controller coupled to a graphic display device, an apparatus for dynamic tessellation of graphic primitives comprising curved surfaces for rendering the graphic primitives as graphic images on the graphic display device, said primitives defined in a Model Coordinate (MC) space according to control points, transformed to World Coordinate (WC) space and rendered as images in Device Coordinate (DC) space, said graphic display device defined according to said DC space, said tessellation meeting a tessellation threshold defined in the DC space, said apparatus comprising:

means for determining derivative bounds of the curved surface;

a first mapping means for mapping the derivative bounds to a Lighting Coordinate (LC) space;

a first transformation means to transform the control points to the LC space, said transformation means performing an affine transformation;

a second mapping means for mapping a tessellation threshold to the LC space;

means for determining a uniform step size for the tessellation of the curved surface which is within the tessellation threshold;

means for tessellating the curved surface into polygons;

lighting means for lighting the polygons in accordance with light sources defined for the graphic primitive to be rendered;

a second transformation means for transforming the polygons to DC space;

means for generating pixel data representative of each polygon, each pixel data specifying an intensity of the pixel to be displayed on the graphic display device;

a frame buffer for the storage of each pixel data, wherein memory locations of the frame buffer correspond to locations in DC space;

scan conversion means for generating pixel data representative of each polygon and storing the pixel data in the frame buffer, each pixel data specifying the intensity of the pixel to be displayed on the graphic display device;

a graphic display controller for reading the pixel data stored in the frame buffer and generating control signals to actuate the pixels at the location and intensity indicated by the pixel data;

wherein curved surfaces are dynamically tessellated into graphic images in the LC space and transformed to the DC space.

12. The apparatus as set forth in claim 11, wherein said first mapping means for translating the derivative bounds of the curved surface to the LC space comprises:

an M' transformation utilized to transform the curved surface from MC space to LC space, said M' transformation being an affine transform; and means for determining the norm of the M' transformation;

means for mapping the derivative bounds according to a norm of the M' transformation.

13. The apparatus as set forth in claim 11, wherein the first transformation means for transforming the control points of the curve to LC space comprises:

an M' transformation utilized to transform the curved surface from the MC space to the LC space, said M' transformation being an affine transform; and means for transforming the control points using the M' transform, said transformation orientation of the curved surface defined by the control points.

14. The apparatus as set forth in claim 11, wherein the second mapping means for mapping the tessellation threshold to LC space comprises:

an N transformation which transforms a curved surface from the LC space to the DC space;

means for determining a maximum scale of the N transformation; and means for mapping the tessellation threshold using the maximum scale of the N transformation.

15. The apparatus as set forth in claim 11, wherein the means for determining the uniform step size in LC space comprises means for determining the uniform step size according to the following:

$$s_d{}^u = \frac{1}{n_d{}^u} \quad s_d{}^v = \frac{1}{n_d{}^v}$$

where $s_d{}^u$ and $s_d{}^v$ respectively represent the uniform step size in the u direction and the v direction and $$n_d{}^u = \frac{\sqrt{D_{uu}D_{vv} + D_{uv}\sqrt{D_{uu}D_{vv}}}}{2\sqrt{t_d D_{vv}}}$$

$$n_d{}^v = \frac{\sqrt{D_{uu}D_{vv} + D_{uv}\sqrt{D_{uu}D_{vv}}}}{2\sqrt{t_d D_{uu}}}$$

where $D_{uu}$ is the second derivative bound of the surface function representative of the curved surface with respect to u, $D_{vv}$ is the second derivative bound of the surface function with respect to v and $D_{uv}$ is the derivative bound of the surface function with respect to u and v, and $t_d$ is the tessellation threshold in the LC space.

16. The apparatus as set forth in claim 11, wherein the polygons are triangles.

17. The apparatus as set forth in claim 11, wherein said means for tessellating the curved surface tessellates using forward differencing.

18. The apparatus as set forth in claim 1, further comprising a means for defining the curved surface as a Bezier function.

* * * * *

UNITED STATES PATENT AND TRADEMARK OFFICE
CERTIFICATE OF CORRECTION

PATENT NO. : 5,261,029
DATED : November 9, 1993
INVENTOR(S) : Abi-Ezzi et al.

It is certified that error appears in the above-identified patent and that said Letters Patent is hereby corrected as shown below:

In column 17, claim 13 at line 2, please delete " transform " and insert
-- transformation --..

In column 17, claim 13 at line 2, please delete " transformation " and insert
-- transform --..

Signed and Sealed this

Twenty-first Day of October 1997

Attest:

BRUCE LEHMAN

Attesting Officer

Commissioner of Patents and Trademarks